United States Patent
Yu

(10) Patent No.: US 12,160,684 B2
(45) Date of Patent: Dec. 3, 2024

(54) DYNAMIC ASPECT RATIO ADJUSTMENT DURING VIDEO CONFERENCING

(71) Applicant: Zoom Video Communications, Inc., San Jose, CA (US)

(72) Inventor: Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 191 days.

(21) Appl. No.: 17/844,463

(22) Filed: Jun. 20, 2022

(65) Prior Publication Data

US 2023/0412656 A1 Dec. 21, 2023

(51) Int. Cl.
*H04N 7/15* (2006.01)
*H04L 65/403* (2022.01)
*G10L 15/22* (2006.01)
*H04L 65/1089* (2022.01)

(52) U.S. Cl.
CPC ............. *H04N 7/15* (2013.01); *H04L 65/403* (2013.01); *G10L 15/22* (2013.01); *G10L 2015/228* (2013.01); *H04L 65/1089* (2013.01)

(58) Field of Classification Search
None
See application file for complete search history.

(56) References Cited

U.S. PATENT DOCUMENTS

| | | | |
|---|---|---|---|
| 7,554,571 B1 | 6/2009 | Beck et al. | |
| 8,350,891 B2 | 1/2013 | Khot et al. | |
| 8,760,489 B1 | 6/2014 | Osher et al. | |
| 9,172,907 B2 | 10/2015 | Osher et al. | |
| 10,917,608 B1 | 2/2021 | Faulkner et al. | |
| 10,924,709 B1* | 2/2021 | Faulkner | H04N 7/15 |
| 11,050,973 B1 | 6/2021 | Faulkner et al. | |
| 11,064,256 B1* | 7/2021 | Voss | H04N 21/47 |
| 2011/0115876 A1* | 5/2011 | Khot | H04N 7/15 348/14.09 |

(Continued)

FOREIGN PATENT DOCUMENTS

WO 2022000158 A1 1/2022

OTHER PUBLICATIONS

International Search Report and Written Opinion mailed on Sep. 5, 2023 in corresponding PCT Application No. PCT/US2023/025052.

*Primary Examiner* — Quoc D Tran
(74) *Attorney, Agent, or Firm* — Young Basile Hanlon & MacFarlane, P.C.

(57) ABSTRACT

Aspect ratios used to display video streams within a graphical user interface (GUI) of a video conference are dynamically adjusted based on events detected during the video conference. According to one approach, during a video conference between a first device and a second device, a first video stream from the first device and a second video stream from the second device are both displayed within the GUI using an initial aspect ratio. Based on the first video stream, an event corresponding to a change in a number of people participating in the video conference from the first device is determined. Based on the event, an adjusted aspect ratio to use for displaying the first video stream within the GUI is determined. The first video stream is displayed within the GUI using the adjusted aspect ratio while the second video stream remains displayed within the GUI using the initial aspect ratio.

20 Claims, 8 Drawing Sheets

(56) References Cited

U.S. PATENT DOCUMENTS

| | | | |
|---|---|---|---|
| 2015/0109400 A1* | 4/2015 | Wang | G06F 3/0486 |
| | | | 348/14.03 |
| 2017/0187776 A1* | 6/2017 | Pell | H04L 65/765 |
| 2022/0303478 A1* | 9/2022 | Xu | H04L 65/762 |
| 2023/0412785 A1* | 12/2023 | Benchemsi | H04N 7/147 |

* cited by examiner

US 12,160,684 B2

1

DYNAMIC ASPECT RATIO ADJUSTMENT DURING VIDEO CONFERENCING

FIELD

This disclosure generally relates to dynamic aspect ratio adjustment during video conferencing, and, more specifically, to adjusting the aspect ratio used to display one or more video streams from devices of participants of a video conference based on events detected during the video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
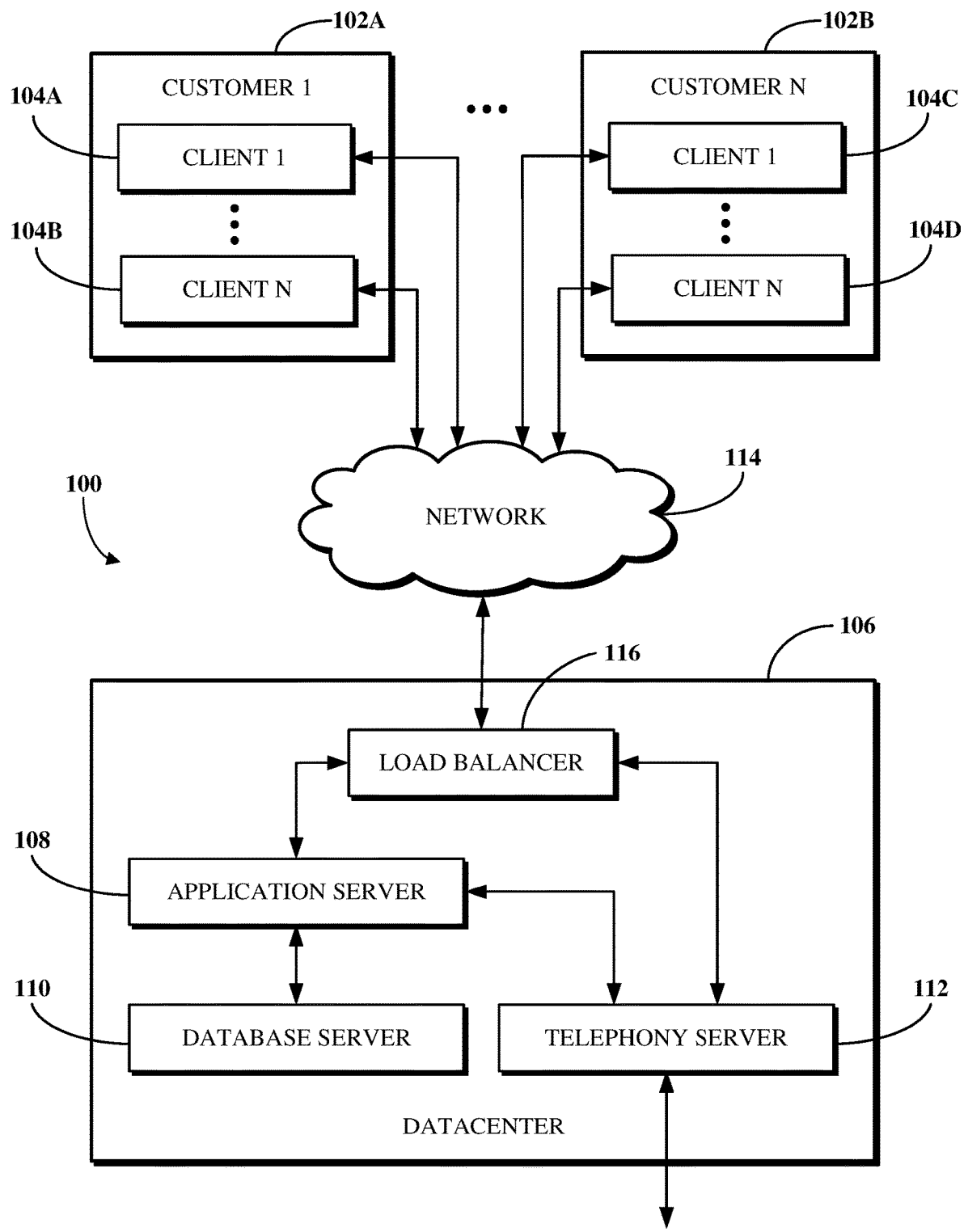
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

During a video conference, video streams captured at participant devices are transmitted to a server for processing before being routed to the participant devices for display using some single aspect ratio (e.g., 3:4 or 16:9) for all such video streams. Video conferences typically feature multiple conference participants depicted within a GUI, in which the conference participants themselves are the main focus of the video content being streamed. In some cases, a camera of or otherwise used by a participant device may have a field of view which includes more than the conference participant using the participant device. Much of the content within the video stream captured by the camera may thus correspond other than to the subject conference participant (e.g., background objects, such as empty wall space) and accordingly be irrelevant to the video conference. However, displays of participant devices only have so much space for displaying video streams of conference participants. Including irrelevant content within a video stream that is ultimately displayed at participant devices will result in valuable display space being dedicated to the irrelevant content, rather than that display space being focused on the subject conference participant.

One solution to limiting the display of irrelevant content within a video stream may include cropping the video stream to more closely focus on the one or more conference participants depicted therein. For example, the cropping may be performed either at the participant device at which the video stream is captured or at a server device which runs the conferencing software that implements the video conference. Given typical megapixel capabilities of modern cameras, the cropped video streams may in at least some cases still depict the subject conference participants at high quality resolutions. The cropped video streams thus better utilize the limited display space available at the participant devices by focusing on the conference participants, that is, the video content that matters most in the video conference.

However, this solution suffers a material drawback. Because it is important to feature all conference participants using a given participant device, if a new conference participant enters a field of video of a camera and engages the ongoing video conference (e.g., based on eye gaze toward the participant device or speech directed toward a remote conference participant) after the video stream captured thereby has been cropped, the new conference participant will be only partially depicted within the video stream (e.g., only a portion of their face may be shown in the cropped video stream) or the two conference participants will be forced to uncomfortably squeeze together generally resulting in parts of both of them not being depicted within the video stream (e.g., the cropped video stream may feature only portions of each of their faces). Alternatively, the video stream could potentially be uncropped to show a greater area of the field of view of the camera. While this would theoretically allow both conference participants to be fully depicted within the video stream, it would also reintroduce irrelevant content into the video stream, thereby compromising the valuable display space previously preserved by the cropping.

Implementations of this disclosure address problems such as these by dynamically adjusting aspect ratios used to display video streams within a GUI of a video conference based on events detected during the video conference. Video streams obtained from participant devices connected to a video conference are displayed using an initial aspect ratio, which may be the same or different for the various video streams. During the video conference, an event is determined based on one of the video streams, in which the event corresponds to some change related to the display of video data within the GUI of the video conference (e.g., a change in a number of people participating in the video conference from a given participant device). An adjusted aspect ratio is determined for the subject video stream based on the determined event, and the subject video stream is then displayed using the adjusted aspect ratio in place of the initial aspect ratio. In some cases, all of the video streams will be displayed using the adjusted aspect ratio. In other cases, only the subject video stream is displayed using the adjusted aspect ratio, while the other video streams remain displayed using their then-current aspect ratios (e.g., the initial aspect ratio earlier determined therefor).

Accordingly, and referring to the example described above presented to illustrate the drawbacks of the cropping solution, the implementations of this disclosure may be used to adjust the manner by which a video stream is displayed after a new conference participant enters the field of view of the camera of a subject participant device by adjusting the aspect ratio used for displaying the video stream to one which enables the video stream to depict both conference participants. For example, an initial aspect ratio of 9:16 may be adjusted to 4:3, in which 9:16 represents a common aspect ratio usable in a portrait mode orientation for a one-to-one conversation and 4:3 represents a common aspect ratio usable in a landscape mode orientation for conversations in which multiple people are using the subject participant device. In this way, the valuable content of the video streams—the conference participants using the subject participant devices—are depicted within the video streams when output for display without including irrelevant content excluded by a previous cropping of the video stream that would otherwise be reintroduced by maintaining the initial aspect ratio.

To describe some implementations in greater detail, reference is first made to examples of hardware and software structures used to implement a system for dynamic aspect ratio adjustment. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
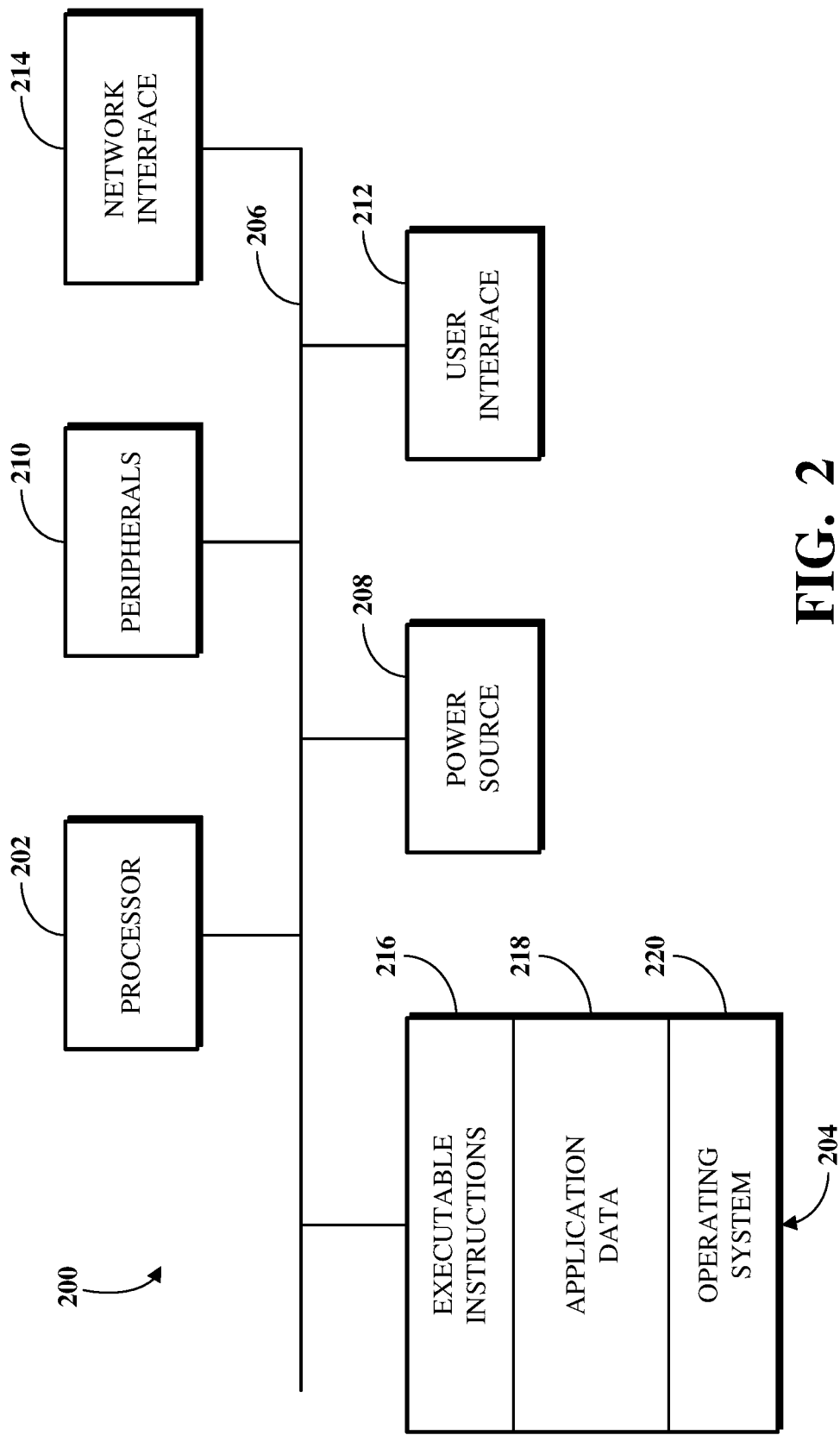
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
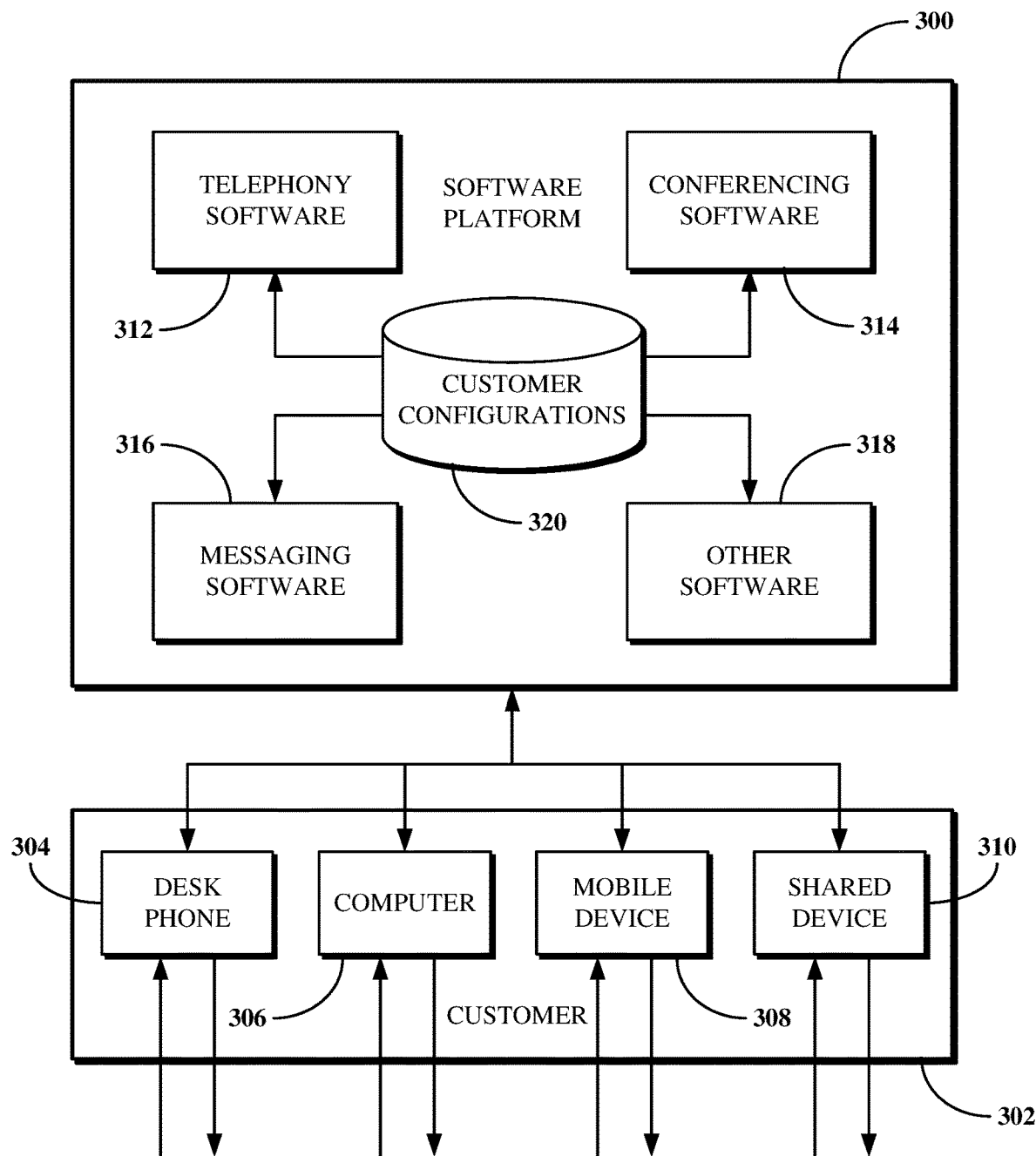
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for dynamic aspect ratio adjustment. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a GUI element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
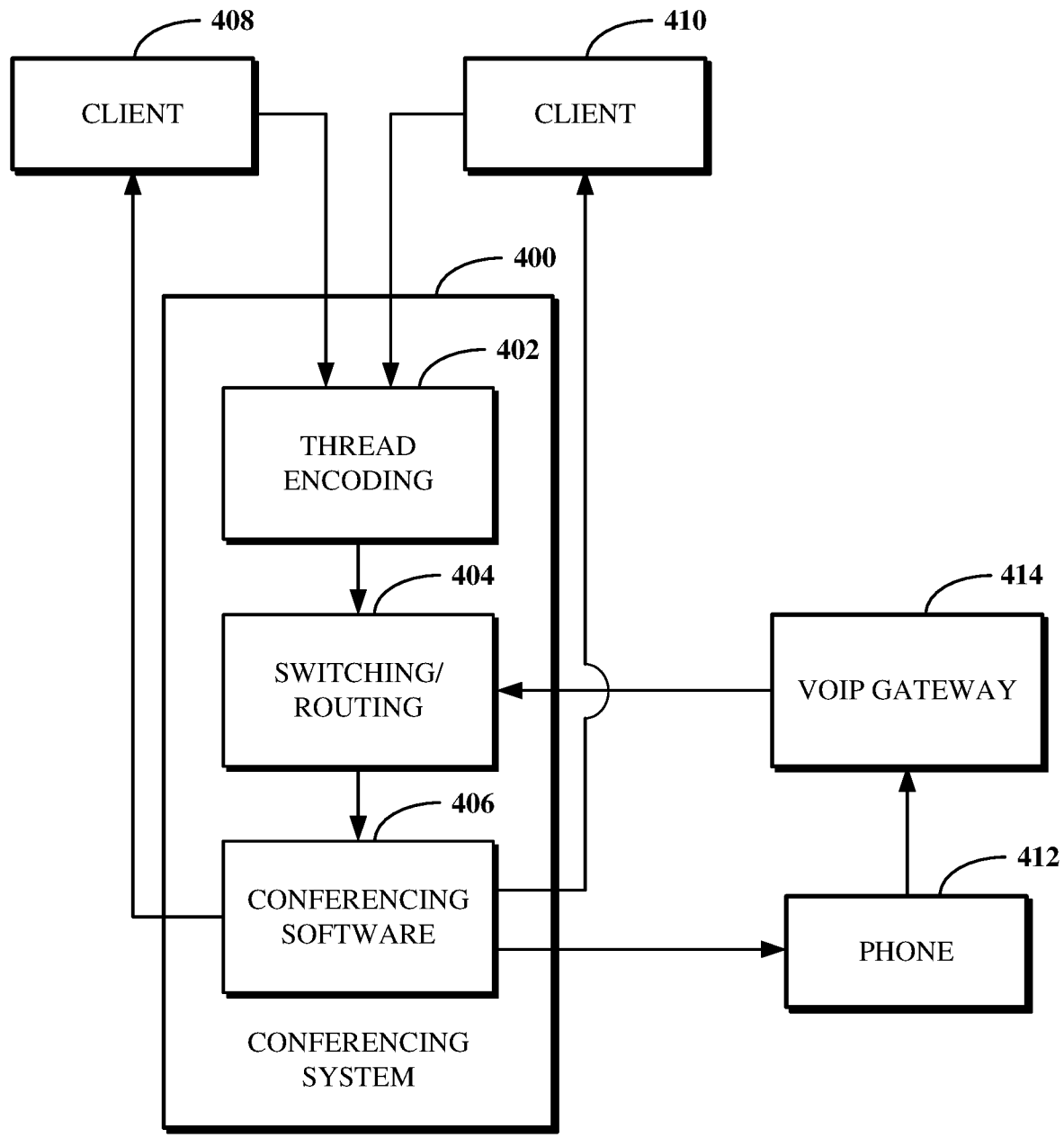
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a GUI of a video conference implemented by the conferencing software 406 which displays information (e.g., a rendered video) associated with one or more conference participants. A user interface tile may, but need not, be generally rectangular. The size of a user interface tile may depend on one or more factors including the view style set for the video conference GUI at a given time and whether the one or more conference participants represented by the user interface tile are active speakers at a given time. The view style for the video conference GUI, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the video conference GUI while the user interface tiles for other conference participants are reduced in size and arranged near an edge of the video conference GUI.

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 240p, 360p, 480p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a GUI of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
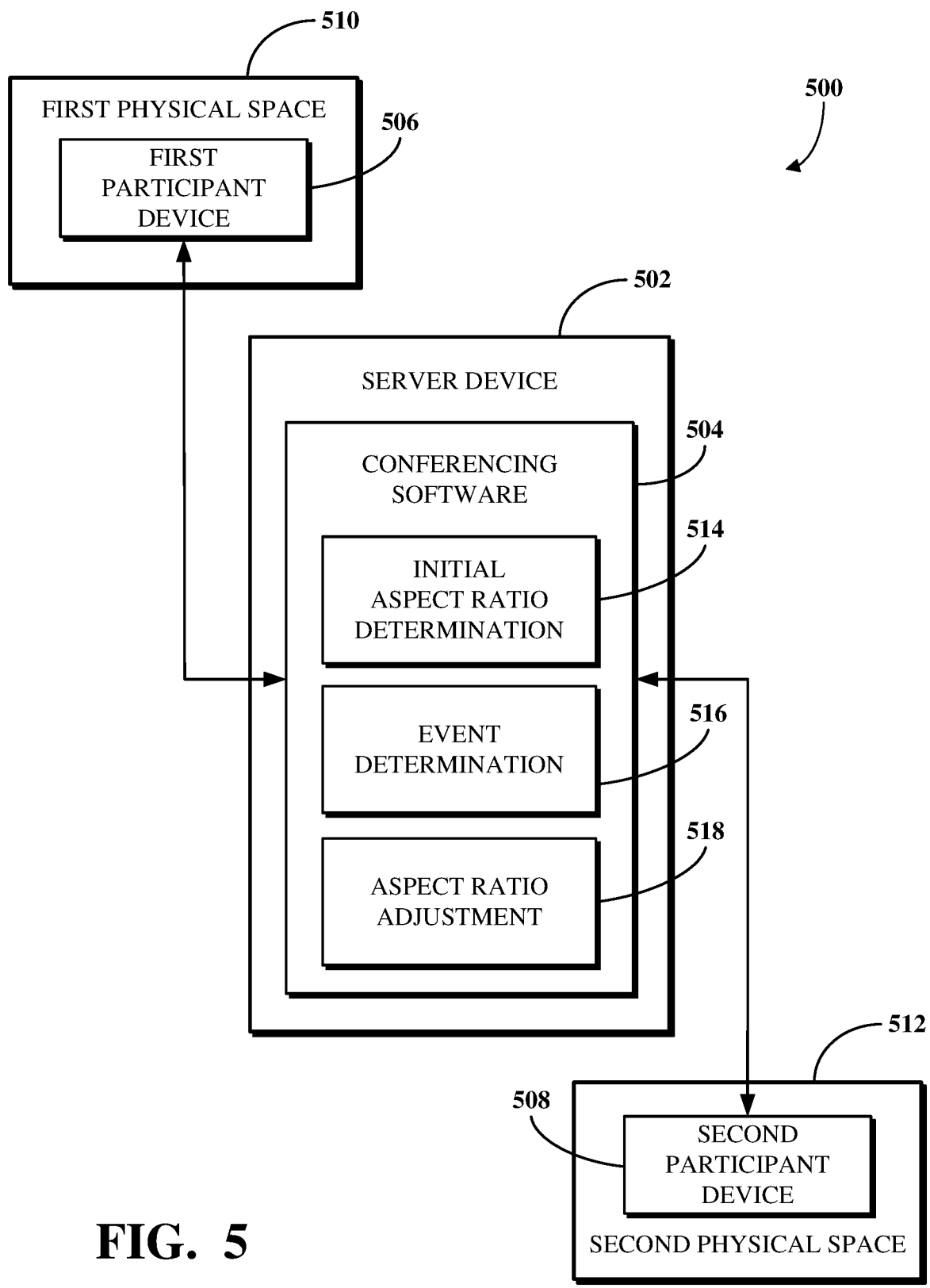
FIG. 5 is a block diagram of an example of a system for dynamic aspect ratio adjustment.

FIG. 5 is a block diagram of an example of a system 500 for dynamic aspect ratio adjustment. The system 500 includes a server device 502 that runs conferencing software 504 for implementing a video conference. For example, the server device 502 may be a server of the conferencing system 400 shown in FIG. 4 and the conferencing software may be the conferencing software 406 shown in FIG. 4. In another example, the conferencing software 504 may be the conferencing software 314 shown in FIG. 3 and the server device 502 may be a server used to implement the conferencing software 502 as part of the software platform 300 shown in FIG. 3, for example, the application server 108 shown in FIG. 1.

The video conference is attended by at least two conference participants via at least two participant devices connected to the conferencing software 504. As shown, a first participant device 506 and a second participant device 508 are connected to the conferencing software 504. Each of the first participant device 506 and the second participant device 508 is a computing device, for example, a smartphone, laptop computer, tablet computer, desktop computer, conference room computer with accompanying display, smart television, or video-enabled smart speaker. For example, the first participant device 506 and/or the second participant device 508 may be a client device usable with a conferencing system, such as one of the clients 408 or 410 shown in FIG. 4. The first participant device 506 is located at a first physical space 510 and the second participant device 508 is located at a second physical space 512. Each of the first physical space 510 and the second physical space 512 is a place within which one or more people may be physically located, for example, a conference room, a shared or private office, a classroom or lecture hall, a room in a residence (e.g., a living room or kitchen), or a commercial location (e.g., a retail store). Although two participant devices 506 and 508 are shown, other numbers of participant devices may connect to the conferencing software 504 for a subject video conference or otherwise be used with the system 500.

The first participant device 506 and the second participant device 508 each includes or otherwise uses a camera to capture a video stream thereat. The video streams captured using the cameras associated with the first participant device 506 and the second participant device 508 are transmitted to the conferencing software 504. The conferencing software 504 processes those video streams (e.g., as described above with respect to FIG. 4) to cause those video streams to be displayed within a GUI of the video conference. In particular, the conferencing software 504 causes those video streams to be displayed within the GUI of the video conference using a certain aspect ratio. The aspect ratio used for displaying a video stream obtained from a participant device may be dynamically adjusted by the conferencing software 504 during the video conference. The dynamic aspect ratio adjustment is performed to ensure that display space available for outputting video streams at the participant devices connected to the conferencing software 504 is used to display video content relevant to the video conference (e.g., portions of video streams depicting conference participants) while minimizing the amount of video content irrelevant to the video conference (e.g., background objects) being output for display.

The conferencing software 504 thus includes functionality for dynamic aspect ratio adjustment, such as to dynamically adjust an aspect ratio used for displaying a video stream obtained from the first participant device 506 or the second participant device 508 during the video conference attended by the conference participants using those devices. In particular, the conferencing software 504 includes an initial aspect ratio determination tool 514, an event detection tool 516, and an aspect ratio adjustment tool 518. In some implementations, the conferencing software 504 may include a single dynamic aspect ratio adjustment tool that includes the functionality of each of the initial aspect ratio determination tool 514, the event detection tool 516, and the aspect ratio adjustment tool 518. In some implementations, the initial aspect ratio determination tool 514, the event detection tool 516, and/or the aspect ratio adjustment tool 518, or the representative functionalities thereof, may exist outside of the conferencing software 504.

The initial aspect ratio determination tool 514 determines an initial aspect ratio to use for displaying video streams obtained from the participant devices connected to the conferencing software 504 at a start of the subject video conference or otherwise upon those respective participant devices connecting to the video conference. In particular, each video stream is displayed within a separate user interface tile of the video conference using an initial aspect ratio, for example, 4:3, 16:9, 3:4, or 9:16. In some cases, the same initial aspect ratio may be used for displaying all video streams. In other cases, different video streams may be displayed using different aspect ratios. The initial aspect ratio determination tool 514 determines the initial aspect ratio for displaying the video streams based on a context of the video conference. The context of the video conference generally refers to the number of conference participants participating in the video conference from each of the connected participant devices. As such, the initial aspect ratio for displaying a given video stream obtained from a participant device may be based on the number of people depicted within the video stream. For example, where a single conference participant is participating in the video conference from each of the first participant device 506 and the second participant device 508, the same initial aspect ratio (e.g., 4:3) may be used for both video streams, and so the video streams obtained from the first participant device 506 and the second participant devices will be displayed using the same initial aspect ratio. In such a case, for example, where a gallery view layout is used for the GUI of the video conference, a first user interface tile within which the video stream obtained from the first participant device 506 is displayed may be the same size as a second user interface tile within which the video stream obtained from the second participant device 508 is displayed. In another example, where a single conference participant is participating in the video conference from the first participant device 506 and two conference participants are participating in the video conference from the second participant device 508, a first initial aspect ratio (e.g., 3:4) may be used to display the video stream obtained from the first participant device 506 and a second initial aspect ratio (e.g., 4:3) may be used to display the video stream obtained from the second participant device 508. In such a case, for example, where a gallery view layout is used for the GUI of the video conference, a first user interface tile within which the video stream obtained from the first participant device 506 is displayed may be smaller (e.g., narrower) than a second user interface tile within which the video stream obtained from the second participant device 508 is displayed.

The initial aspect ratio determination tool 514 determines the context of the video conference (e.g., the number of participants at each connected participant device) by sampling video content and/or audio content from one or more input components (e.g., a camera and/or a microphone) of the participant devices based on connections established between those participant devices and the server device 502. The sampling may occur prior to the participants using a given participant device being allowed to access the video conference, for example, as part of a process for entering into the video conference. Alternatively, the sampling may occur after the participant device has connected and prior to a display of a video stream from that participant device within the GUI of the video conference.

The sampling is performed principally to determine the number of people depicted within a given video stream who are participants of the conference rather than people who appear in the video stream but are not intended as participants (e.g., people in the background where a participant accesses a video conference from a public space). A person may be determined to be participating in the video conference (e.g., rather than simply being depicted within the video stream without participating in the video conference) based on video content of the video stream and/or audio content obtained from the subject participant device along with the video stream. For example, the video stream can be processed to determine one or more factors indicative of participation in the video conference, such as whether a given person depicted therein is facing or otherwise looking at the camera, whether their mouth is moving across multiple video frames (e.g., indicating that they may be speaking), or whether they are depicted within the video stream for more than a threshold duration (e.g., five seconds). In another example, the audio content obtained along with the video stream can be processed to determine whether speech is detected from a given person, such as by comparing times at which the mouth of the given person appears to be moving with times at which speech is recognized (e.g., within a real-time transcription of the video conference). In yet another example, such video and audio processing may be used in combination, such as via sensor fusion, to determine participation or otherwise validate a determination of participation made by one of the video or audio processing described above alone.

In some implementations, the sampling may also be performed to determine where conference participants depicted within the obtained video streams are located within those video streams (e.g., centered or off-center) and/or sizes of those conference participants within the respective video streams (e.g., indicative of a distance between a given conference participant and a camera of their participant device). For example, region of interest processing can be performed against the video stream obtained from a participant device, such as using object detection, to determine a location of a human face within the video frames of the video stream, in which that location may be recognized as the location of a conference participant. The object detection output may further indicate a size of the region of interest corresponding to the human face, such as using a bounding box surrounding the human face. Where the size of the human face is determined to be small, the video stream may be cropped and zoomed into to cause the human face to be more visible and to minimize the inclusion of content irrelevant to the video conference. In another example, where the participant is detected to be off-center relative to the camera used to capture the video stream, the video stream may be cropped to cause the participant to appear centered. Where any zooming (e.g., magnification) is determined for a video stream, the conferencing software 504, via the initial aspect ratio determination tool 514 or otherwise, may transmit instructions to the subject participant device to cause the camera of that participant device to begin capturing the video stream using a higher resolution to allow for the zoomed-in video frames to remain at a high quality output.

In some implementations, the instructions transmitted to a participant device to cause a change to video capture configurations used by a camera thereof may be based on an initial aspect ratio determined by the initial aspect ratio determination tool 514. For example, the instructions may indicate to limit or otherwise control the zooming by the camera according to an initial aspect ratio.

In some implementations, the sampling process may be performed at the participant device rather than at the server device. For example, a client application running at a participant device may be used to connect the participant device to the video conference. The client application may sample video content and/or audio content from the camera and/or microphone of the participant device to determine a number of conference participants to participate in a video conference from that participant device as well as or otherwise to determine locations and sizes of conference participants within the video stream captured at the participant device. In some such implementations, information indicative of the sampling output may be transmitted from the client application to the conferencing software 504 to enable the conferencing software 504 to determine the initial aspect ratio for the video stream captured at the participant device. In some such implementations, the client application may determine or otherwise propose an initial aspect ratio for that video stream using modeling information available to the client application and then transmit information indicative of that determined or proposed initial aspect ratio to the conferencing software 504 to complete the initial aspect ratio determination process.

In some implementations, the initial aspect ratio to use for displaying the video streams from the participant devices connected to the video conference may be determined based on display information associated with those participant devices. The display information associated with a participant device may correspond to one or both of display capabilities of the participant device or orientation information of the participant device. For example, the display capabilities of a participant device may correspond to dimensions of a display of the participant device, accessible via operating system-level access permissions granted to software running at the participant device (e.g., a client application used to connect to the video conference). Where a single initial aspect ratio is determined for all participant devices (e.g., where the same number of participants is using each such participant device), the display capabilities of the participant devices may be evaluated to determine limitations on the initial aspect ratio. For example, if the first participant device 506 supports both 4:3 and 16:9 aspect ratios but the second participant device 508 only supports 4:3, the initial aspect ratio may be determined as 4:3 to accommodate both participant devices. In another example, the orientation information may correspond to an indication of whether the participant device, or at least the display thereof, is in a portrait orientation mode or a landscape orientation mode. For example, where the initial aspect ratio for the first participant device 506 and the second participant device 508 is determined to be 16:9, and orientation information of those devices indicates that both devices are in a portrait orientation mode (e.g., where the first participant device 506 and the second participant device 508 are smartphones being used by one person each), the initial aspect ratio may instead be set as 9:16. In some such implementations, where both devices are in a portrait orientation mode and a single conference participant is using each device, a specific aspect ratio according to the display capabilities of the devices may be enforced. In some such implementations, where a determination is made that different orientation modes are used by different participant devices (e.g., where the first participant device 506 is a smart phone held in portrait orientation mode and the second participant device 508 is a video-enabled smart speaker device with a display in landscape orientation mode), the same initial aspect ratio may be used where the number of participants at each device is the same or different initial aspect ratios may be enforced for the different devices where that number of participants at each device differs. For example, the video stream obtained from the second participant device 508 may be cropped to cause the video stream to be displayed using a 16:9 aspect ratio matching that of the smartphone's display capabilities in the portrait mode orientation.

The event detection tool 516 determines an event relevant to the video conference based on a video stream received from one of the first participant device 506 or the second participant device 508, in particular, based on video content within such a video stream. The event is something occurring or otherwise determined during the video conference which may be relevant to adjusting an aspect ratio used for displaying a video stream of one or more participant devices connected to the video conference, to ensure that the content most relevant to the video conference is output for display within the GUI of the video conference. Examples of such events include, but are not limited to, changes in a number of conference participants participating in the video conference from a given participant device, changes in a number of objects relevant to the video conference depicted within a video stream obtained from a given participant device, changes in the orientation of a participant device, and changes in media presented for display within a GUI of the video conference.

Figure 6:
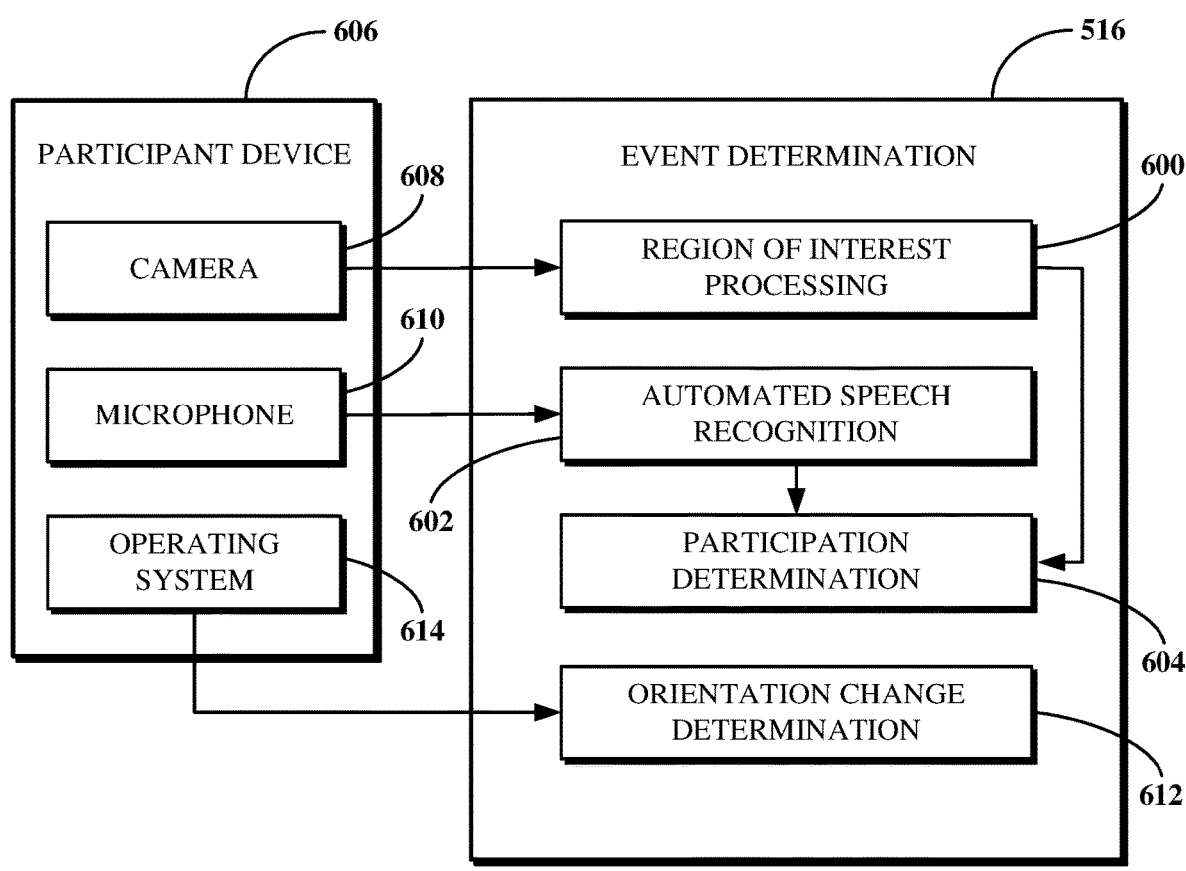
FIG. 6 is a block diagram of an example of event detection functionality used for dynamic aspect ratio adjustment.

The event detection tool 516 is described in detail with reference to FIG. 6, which is a block diagram of an example of event detection functionality of the system 500 for dynamic aspect ratio adjustment shown in FIG. 5, described with reference to the event detection tool 516 shown in FIG. 5. The event detection functionality generally refers to software functionality for determining an event that will serve as the basis for adjusting the aspect ratio used for displaying one or more video streams within a GUI of a video conference. As shown, the event detection tool 516 includes a region of interest processing sub-tool 600, an automated speech recognition sub-tool 602, and a participation determination sub-tool 604 configured to process video content and audio content obtained from a participant device 606, which may, for example, be the first participant device 506 or the second participant device 508 shown in FIG. 5. In particular, the sub-tools 600 through 604 may process video content captured by a camera 608 of the participant device 606 and audio content captured by a microphone 610 of the participant device 606. While the video content and the audio content are shown as being directed from the camera 608 and the microphone 610 to ones of the sub-tools 600 through 604, the video content and the audio content may typically be routed to the event determination tool 516 via conferencing software used to implement the subject video conference, for example, the conferencing software 504 shown in FIG. 5.

The region of interest processing sub-tool 600 processes video content of a video stream captured using the camera 608 to determine changes in regions of interest. In particular, the region of interest processing sub-tool 600 processes that video content to determine changes in a number of regions of interest between video frames of the video stream. For example, the region of interest processing sub-tool 600 may perform object detection against the video content to search for human faces and/or other objects depicted therein. The region of interest processing sub-tool may detect partial objects in addition to whole objects. For example, a region of interest may be detected based on a portion of a human face being detected within the video content, for example, where a person not previously participating in the video conference partially enters a field of view of the camera 608 to briefly interact with conference participants of the video conference. The object detection may be guided by specific object recognition-type modeling, for example, to direct the sub-tool 600 to search for specific types of objects; alternatively, the object detection may be performed using a machine learning model trained to perceive new objects within video content without requiring specific recognition thereof. The region of interest processing sub-tool 600 may further perform gesture recognition such as by evaluating participant activity within the video content against a human behavioral model. The gesture recognition may thus be performed to understand when certain visual gestures are of relevance to detecting an event, such as a conference participant appearing to ask another person to join the video conference by waving their hand toward them (e.g., so as to say "come here," "move closer," or "hello") or by pointing to someone nearby.

The automated speech recognition sub-tool 602 processes audio content captured using the microphone 610 and transmitted alongside the video stream captured using the camera 608 to determine speech indicative of potential new participants or objects of relevance to the video conference. The automated speech recognition sub-tool 602 evaluates a real-time transcription of the video conference using natural language processing to determine when speech from a user of the participant device 606, as captured as part of the audio content, indicates expressly or impliedly that another person not previously a conference participant may become a conference participant for some amount of time (e.g., speech indicating that a conference participant is asking someone to come join the video conference) and/or that an object not previously of relevance to the video conference (e.g., due to its not having been previously addressed or otherwise discussed during the video conference) being addressed or otherwise discussed.

The participation determination sub-tool 604 performs contextual processing against the outputs of the sub-tools 600 and 602 to determine an intention for a person or object corresponding to such outputs to become a participant to the video conference or otherwise become relevant to the video conference. In particular, the participation determination sub-tool 604 combines, or fuses, the outputs of the sub-tools 600 and 602 to more accurately determine intentionality for conference participation by using cues not immediately perceptible in video or audio alone to validate assumptions determined by the sub-tools 600 and 602. For example, times at which audio content processed by the sub-tool 602 indicates speech related to a person or object may be compared by the sub-tool 604 against times at which video content processed by the sub-tool 600 indicates a person or object.

To illustrate by an example, a conference participant using the participant device 606 may be seen by the sub-tool 600 processing the video content to gesture to someone not within a field of view of the camera 608 and with their mouth moving in some way while speech detected by the sub-tool 602 may indicate that a user of the participant device 606 has asked someone to come join the video conference. Where a new region of interest corresponding to a new person is shortly thereafter (e.g., within a threshold duration, such as ten seconds) determined within the video content, the new person may be understood by the sub-tool 604 as being the person intended as a new conference participant, and the event determination tool 516 may accordingly determine an event corresponding to a new conference participant being present at the participant device 606 (i.e., an increase in a number of participants depicted within the video stream obtained from the participant device 606.

To illustrate by another example, a new region of interest corresponding to a new person not previously a conference participant may be determined by the sub-tool 600 processing the video stream obtained from the camera 608, and speech may be detected by the sub-tool 602 as being from someone who has not previously spoken during the video conference. Where that new region of interest is detected for more than a threshold period of time, the sub-tool 604 may determine an intention for the new person to be a new conference participant. For example, this may occur where someone new joins an existing conference participant in a video conference without first being asked to join. However, where the new region of interest is detected for less than the threshold period of time, the sub-tool 604 may determine a lack of intention for the new person to be a new conference participant. For example, this may occur where the existing conference participant is merely saying a quick hello to the new person or vice versa.

As previously mentioned, the event may additionally or alternatively correspond to a change in orientation of a subject participant device. As shown, the event determination tool 516 further includes an orientation change determination sub-tool 612 and the participant device 606 includes an operating system 614 that recognizes a current orientation mode for a display of the participant device 606 (i.e., whether the display is in the portrait orientation mode or the landscape orientation mode). For example, information indicative of the current orientation mode for the display of the participant device may be accessed using software running at the participant device 606 having operating system-level access permissions (e.g., a client application configured to connect the participant device 606 to the video conference). The orientation change determination 612 receives such information and processes same to determine when a change in the current orientation mode for the display of the participant device 606 occurs (e.g., when the participant device 606 or the display used therewith is rotated from a portrait orientation mode to a landscape orientation mode). Such a change in orientation may be determined by the sub-tool 612 as an event.

In some implementations, and as alluded to above, the event determination tool 516 may determine an event unrelated to the video stream obtained from a given participant device or the participant device itself. For example, the event determination tool 516 can determine an event associated with media presented for display within a GUI of the video conference, such as screen share content introduced by one or more conference participants being initiated or terminated and/or one or more participant devices connecting to or disconnecting from the video conference. For example, screen share content detected from the first participant device 506 or the second participant device 508 may, upon initialization of the screen share content, be displayed within the GUI using the initial aspect ratio or another aspect ratio determined for the screen share content. The initiation or termination of such screen sharing may thus be determined by the event determination tool 516 as an event. Similarly, the connection to or disconnection from the video conference by a participant device may be determined by the event determination tool 516 as an event.

In some implementations, the event detection tool 516 can perform auto-framing to determine movements of previously determined regions of interest. For example, a region of interest associated with a human face of a conference participant can be determined to move when the conference participant stands up. To illustrate, the conference participant may initially be sitting, in which the video stream obtained from their participant device depicts only an upper torso portion of the body of that conference participant. When the conference participant stands up, the region of interest corresponding to their face is determined to have moved. Contextual processing by the participation determination sub-tool 604 may process the video content representing the movement of the region of interest in addition to speech from co-located audio content to determine that the conference participant has stood up or otherwise moved for a specific purpose. For example, speech processed by the automated speech recognition sub-tool 602 may indicate that the conference participant is showing off their clothes as a new outfit they recently obtained. In such a case, the participation determination sub-tool 604 may recognize the clothes, or the entire body, of the conference participant as a new object relevant to the video conference depicted within the video stream. This may therefore result in a determination of an event corresponding to a change in objects relevant to the video conference and depicted within the video stream.

The aspect ratio adjustment tool 518 dynamically adjusts the aspect ratio used to display one or more video streams within the GUI of the video conference based on the event determined by the event determination tool 516. In particular, the specific manner by which to adjust the aspect ratio for a given video stream is based upon the specific event determined and the current aspect ratio being used to display the given video stream (e.g., the initial aspect ratio determined by the initial aspect ratio determination tool 514 or a previously adjusted aspect ratio determined by the aspect ratio adjustment tool 518). Where the event corresponds to a change in a number of people participating in the video conference from a participant device, adjusting the aspect ratio used for displaying the video stream from that participant device within the GUI of the video conference includes either increasing the aspect ratio from the current (e.g., initial) aspect ratio to an adjusted aspect ratio where the change corresponds to an increase in the number of people participating from the participant device or decreasing the aspect ratio from the current aspect ratio to an adjusted aspect ratio where the change corresponds to a decrease in the number of people participating from the participant device. Where the event corresponds to a change in a number of objects relevant to the video conference being depicted within the video stream from a participant device, adjusting the aspect ratio used for displaying the video stream from that participant device within the GUI of the video conference includes either increasing the aspect ratio from the current (e.g., initial) aspect ratio to an adjusted aspect ratio where the change corresponds to an increase in the number of objects or decreasing the aspect ratio from the current aspect ratio to an adjusted aspect ratio where the change corresponds to a decrease in the number of objects. Where the event corresponds to a change in an orientation of a participant device, adjusting the aspect ratio used for displaying the video stream from that participant device within the GUI of the video conference includes inverting the aspect ratio from the current (e.g., initial) aspect ratio to an adjusted aspect ratio (e.g., from 4:3 to 3:4 or from 9:16 to 16:9) where the display capabilities of the participant device permit for both the current and adjusted aspect ratios. Where the event corresponds to a change in media within the video conference from a participant device (e.g., a screen share process initiating or terminating or a participant device connecting or disconnecting from the video conference), adjusting the aspect ratio used for displaying the video stream from that participant device within the GUI of the video conference includes either increasing the aspect ratio from the current (e.g., initial) aspect ratio to an adjusted aspect ratio where the change corresponds to the media being removed (e.g., by a screen share process being terminated) or decreasing the aspect ratio from the current aspect ratio to an adjusted aspect ratio where the change corresponds to the media being added (e.g., by a screen share process being initiated).

The video stream obtained from the participant device is then displayed within the GUI of the video conference using the adjusted aspect ratio. Displaying the video stream within the GUI of the video conference using the adjusted aspect ratio results in a change in the amount of space within the GUI used to display the video stream. For example, a size of a user interface tile within which the video stream is displayed may be changed according to the adjusted aspect ratio. In another example, the space within the user interface file used to display the video stream may be changed according to the adjusted aspect ratio without changing the size of the user interface tile itself.

Typically, adjustments made to an aspect ratio used to display a given video stream within the GUI of a video conference are limited to that video stream. Therefore, other video streams may remain displayed using their current (e.g., the initial) aspect ratio rather than changing to the same adjusted aspect ratio. However, in some cases, a policy may be enforced to cause all video streams to be displayed using a same aspect ratio for consistency. In such a case, the adjustment to an aspect ratio for a given video stream will cause the aspect ratios used to display all video streams to be adjusted to the same new aspect ratio. In some implementations, the dynamic aspect ratio adjustment performed by the system 500 may be subject to manual participant control. For example, the conferencing software 504 may transmit a prompt to a participant device to request that a user thereof accept to change the aspect ratio used to display the video stream obtained therefrom before effectuating such change.

In some implementations, a virtual background used by a participant device for which the aspect ratio is adjusted by the aspect ratio adjustment tool 518 may be modified, removed, or added based on the adjustment to the aspect ratio. For example, the participant using the first participant device 506 may be using a virtual background to start the video conference. Where a new person enters the field of view of the first participant device 506 and the event determination tool 516 determines an intention to include the new person within the video conference as a new conference participant, the conferencing software 504 (or other software, such as a client application running at the first participant device 506) may remove the virtual background to prevent the virtual background from limiting visibility of the new conference participant within the video stream obtained from the first participant device 506. In some such cases, upon that new person later leaving the field of view of the camera of the first participant device 506, the virtual background may be re-added to the video stream from the first participant device 506. In another example, the virtual background can be modified to treat both the original and the new conference participants as foreground objects to be combined onto the virtual background when producing composite images to include in the video stream of the first participant device 506. In such a case, based on the change in the number of people participating in the video conference from the first participant device 506 corresponding to a new person being detected within video stream therefrom, composite images may be generated by combining a foreground including portions depicting the new person and the initial conference participant using the first participant device 506 within images captured by a camera of the first participant device 506 and a virtual background used at the first participant device 506 for the video conference.

Figure 7A:
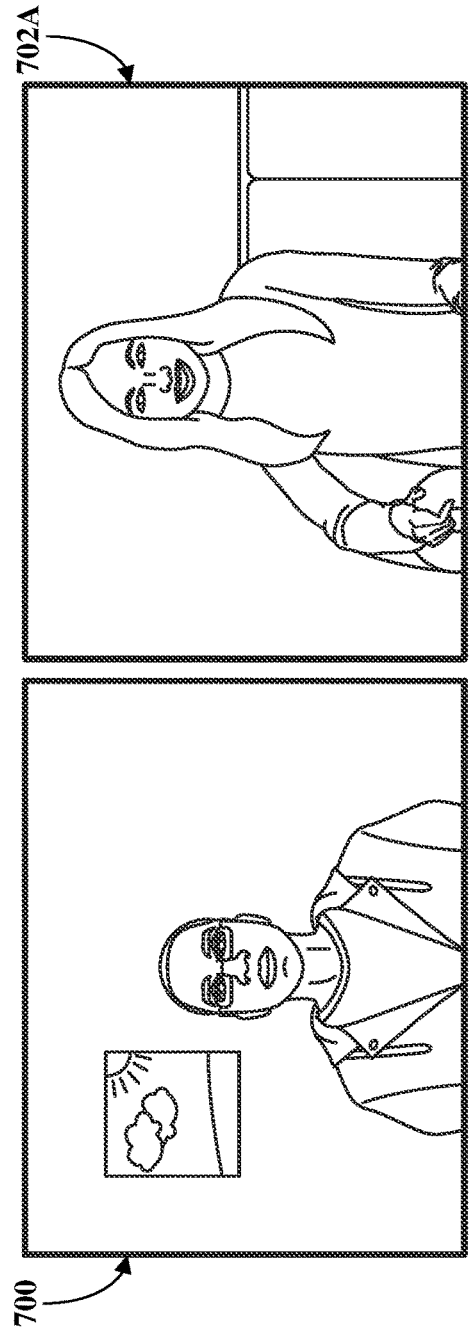
FIG. 7A is an illustration of an example of a graphical user interface (GUI) of a video conference in which first and second video streams are displayed using a same aspect ratio.
Figure 7B:
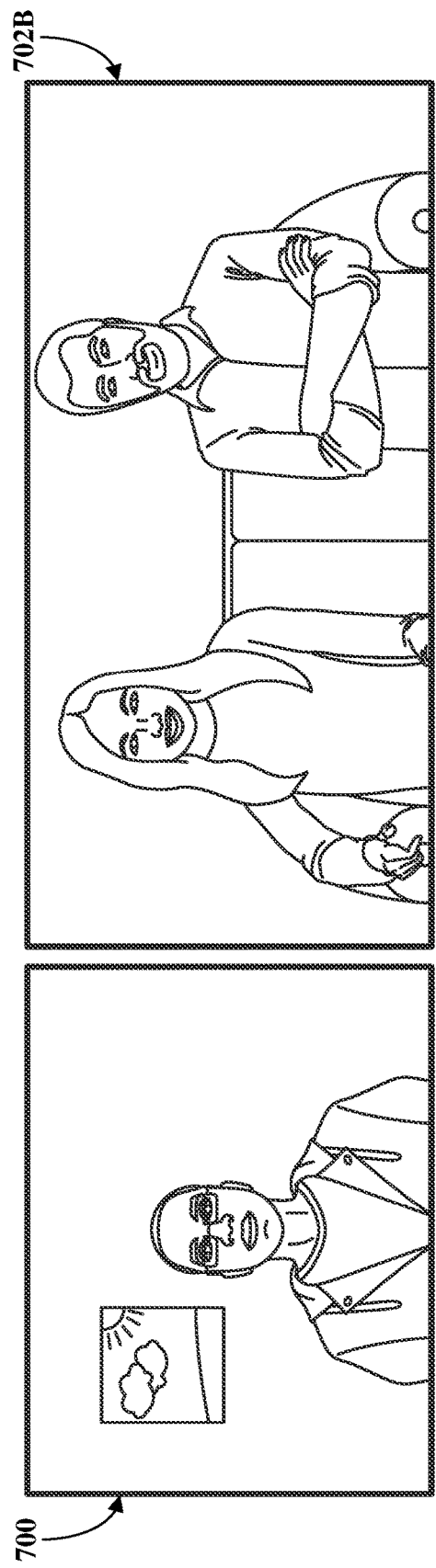
FIG. 7B is an illustration of an example of the GUI of FIG. 7A in which the first video stream is displayed using an adjusted aspect ratio while the second video stream remains displayed using the same aspect ratio.

To illustrate a first example use case in which the system 500 performs dynamic aspect ratio adjustment during a video conference, a video conference implemented by the conferencing software 504 may initially be attended by two conference participants, each connecting to the conferencing software 504 via one of the first participant device 506 and the second participant device 508. Because there is one person depicted in each of the video stream obtained from the first participant device 506 and the video stream obtained from the second participant device 508, the same initial aspect ratio of 4:3 is used to display each of those video streams within separate user interface tiles of a GUI of the video conference, in which a gallery view layout is used for the GUI. For example, those video streams may be depicted as shown in FIG. 7A, which is an illustration of an example of a GUI of a video conference in which first and second video streams are displayed using a same initial aspect ratio (e.g., 4:3). In particular, the GUI includes a first user interface tile 700 within which a video stream obtained from the first participant device 506 is displayed and a second user interface tile 702A within which a video stream obtained from the second participant device 508 is displayed. In this example, the first participant device 506 may be a smart phone, tablet computer, or desktop computer, and the second participant device 506 may be a television or conference room display that uses a camera (e.g., via a wired connection). At some point during the video conference, an event associated with the video stream obtained from the second participant device 508 is determined. In particular, the event corresponds to a new conference participant being detected within the field of view of the camera of the second participant device 508 and being determined as a participant of the video conference. Based on the event, an adjusted aspect ratio is determined for the video stream obtained from the second participant device 508 so as to cause both conference participants depicted therein to be shown within the GUI of the video conference. The video stream obtained from the second participant device 508 may thus be displayed using the adjusted aspect ratio while the video stream obtained from the first participant device 506 remains displayed using the initial aspect ratio. FIG. 7B is an illustration of an example of the GUI of FIG. 7A in which the first video stream is displayed using an adjusted aspect ratio while the second video stream remains displayed using the initial aspect ratio. In particular, as shown in FIG. 7B, the first user interface tile 700 from FIG. 7A remains displayed at the same aspect ratio (e.g., 4:3) as was used in FIG. 7A, while the second user interface tile 702B is now displayed using the larger, adjusted aspect ratio (e.g., 16:9) to accommodate the two conference participants being depicted therein. The display of the video stream within the second user interface tile 702B using the adjusted aspect ratio enables all of the conference participants depicted within that video stream to be represented within the GUI of the video conference while minimizing the amount of irrelevant content presented within the GUI that would otherwise be included were the video stream to instead be uncropped or otherwise zoomed out.

To illustrate a second example use case in which the system 500 performs dynamic aspect ratio adjustment during a video conference, a video conference implemented by the conferencing software 504 may again be initially attended by two conference participants, each connecting to the conferencing software 504 via one of the first participant device 506 and the second participant device 508. Here, a speaker view layout is used for the GUI of the video conference, and so each may only see the video stream of the other participant at their respective participant device. For example, the first participant device 506 may display the user interface tile 700, which shows a video stream obtained from the second participant device 508, and the second participant device 508 may display the user interface tile 702A, which shoes a video stream obtained from the first participant device 506. As shown, both of the user interface tiles 700 and 702A may be displayed using an initial aspect ratio of 4:3, although other aspect ratios such as 9:16 may instead be used. At some point during the video conference, an event associated with the video stream obtained from the first participant device 506, shown in the user interface tile 702A in FIG. 7A, is detected. The event corresponds to a new conference participant being detected within the field of view of the camera of the first participant device 506 and being determined as a participant of the video conference. Based on the event, an adjusted aspect ratio of 16:9 is determined for the video stream obtained from the first participant device 506. As shown in FIG. 7B, the video stream from the first participant device 506 thus becomes displayed within the user interface tile 702B, representing an extended form of the user interface tile 702A, at the adjusted aspect ratio while the video stream from the second participant device 508 remains displayed within the user interface tile 700 using the initial aspect ratio as shown in FIG. 7A, as well.

Figure 8:
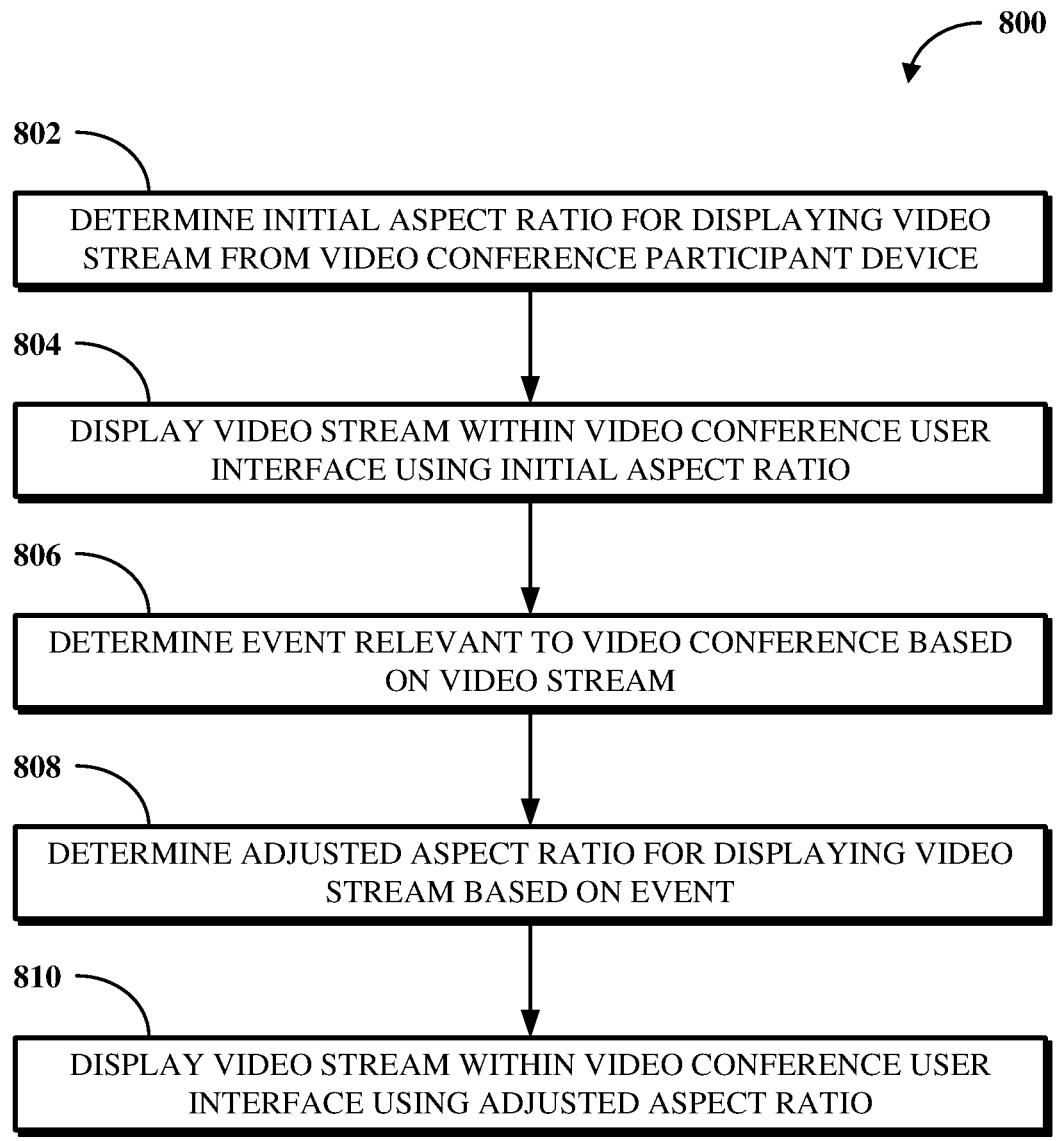
FIG. 8 is a flowchart of an example of a technique for dynamic aspect ratio adjustment.

To further describe some implementations in greater detail, reference is next made to examples of techniques which may be performed by or using a system for dynamic aspect ratio adjustment. FIG. 8 is a flowchart of an example of a technique 800 for dynamic aspect ratio adjustment. The technique 800 can be executed using computing devices, such as the systems, hardware, and software described with respect to FIGS. 1-7B. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, an initial aspect ratio for displaying a video stream obtained from a current participant device connected to a video conference is determined. The initial aspect ratio may be a same initial aspect ratio used to display video streams obtained from one or more other participant devices connected to the video conference. Alternatively, the initial aspect ratio may be determined specific to the video stream obtained from the current participant device or specific to the current participant device itself. The initial aspect ratio may be determined by sampling video and/or audio content captured at the current participant device and/or based on one or both of display capabilities or orientation information for the current participant device. In some cases, the same initial aspect ratio can be used for all participant devices having a same number of users. In some cases, the initial aspect ratio may be determined by a client application running at the current participant device and used to connect the current participant device to the video conference.

At 804, the video stream is displayed within a GUI of the video conference using the initial aspect ratio. For example, the video stream may be displayed within a user interface tile of the GUI. The user interface tile may have a size corresponding to the initial aspect ratio. Where the video conference is attended by two conference participants, each connecting using their own participant devices referred to herein as a first device and a second device, a first video stream from the first device and a second video stream from the second device are both displayed within a GUI of the video conference using the initial aspect ratio. In some cases, to display the first video stream and the second video stream using the initial aspect ratio, images of the first video stream and of the second video stream are cropped according to the initial aspect ratio.

At 806, an event relevant to the video conference is determined based on the video stream at some point during the video conference. For example, the event may correspond to a change in a number of people participating in the video conference from one of the connected devices, such as the first device. The event is determined based on the video stream obtained from the subject participant device—in this case, the first video stream. In some cases, determining the change in the number of people participating in the video conference from the first device can include processing a real-time transcription of the video conference to determine, based on a context of speech represented within the real-time transcription, an intention to include a new person at a location of the first device in the video conference. For example, determining the event can include determining an intention to include a new person at a location of the first device in the video conference based on natural language processing performed against speech audio of the video conference.

At 808, an adjusted aspect ratio for displaying the video stream is determined based on the event. The adjusted aspect ratio is determined based on the determined event and the initial aspect ratio currently being used to display the subject video stream. For example, where the change in the number of people participating in the video conference from the first device corresponds to an increase in the number of people depicted within the first video stream, determining the adjusted aspect ratio includes increasing an aspect ratio used for displaying the first video stream within the GUI of the video conference from the initial aspect ratio to the adjusted aspect ratio, in which the use of the adjusted aspect ratio causes a depiction of a larger portion of a field of view of a camera of the first device within the first video stream. In some such cases, use of the initial aspect ratio causes a display of the first video stream using a portrait orientation and use of the adjusted aspect ratio causes a display of the first video stream using a landscape orientation. Where the change in the number of people participating in the video conference from the first device corresponds to a decrease in the number of people depicted within the first video stream, determining the adjusted aspect ratio includes decreasing an aspect ratio used for displaying the first video stream within the GUI of the video conference from the initial aspect ratio to the adjusted aspect ratio, in which the use of the adjusted aspect ratio causes a depiction of a smaller portion of a field of view of a camera of the first device within the first video stream. As such, in some cases, regardless of the particulars of the event, the first video stream is displayed at a first orientation when the initial aspect ratio is used and at a second orientation when the adjusted aspect ratio is used.

At 810, the video stream is displayed within the GUI of the video conference using the adjusted aspect ratio. In some cases, all video streams are displayed using the adjusted aspect ratio. In other cases, only the subject video stream is displayed using the adjusted aspect ratio. For example, the first video stream described above is may be displayed within the GUI of the video conference using the adjusted aspect ratio while the second video stream remains displayed within the GUI of the video conference using the initial aspect ratio.

In some implementations, the technique 800 may later include determining, based on the first video stream, that the number of people participating in the video conference from the first device has returned to an initial value. In such a case, the technique 800 may further include determining, based on the number of people participating in the video conference from the first device having returned to the initial value, to use the initial aspect ratio to display the first video stream within the GUI of the video conference.

The implementations of this disclosure correspond to methods, non-transitory computer readable media, apparatuses, systems, devices, and the like. In some implementations, a method comprises displaying, during a video conference between a first device and a second device, a first video stream from the first device and a second video stream from the second device within a graphical user interface of the video conference, wherein both of the first video stream and the second video stream are displayed using an initial aspect ratio; determining, based on the first video stream, a change in a number of people participating in the video conference from the first device; determining, based on the change in the number of people participating in the video conference from the first device, an adjusted aspect ratio to use for displaying the first video stream within the graphical user interface of the video conference; and displaying the first video stream within the graphical user interface of the video conference using the adjusted aspect ratio while the second video stream remains displayed within the graphical user interface of the video conference using the initial aspect ratio. In some implementations, a non-transitory computer readable medium stores instructions operable to cause one or more processors to perform operations comprising displaying, during a video conference between a first device and a second device, a first video stream from the first device and a second video stream from the second device within a graphical user interface of the video conference, wherein both of the first video stream and the second video stream are displayed using an initial aspect ratio; determining, based on the first video stream, a change in a number of people participating in the video conference from the first device; determining, based on the change in the number of people participating in the video conference from the first device, an adjusted aspect ratio to use for displaying the first video stream within the graphical user interface of the video conference; and displaying the first video stream within the graphical user interface of the video conference using the adjusted aspect ratio while the second video stream remains displayed within the graphical user interface of the video conference using the initial aspect ratio. In some implementations, an apparatus comprises a memory and a processor configured to execute instructions stored in the memory to display, during a video conference between a first device and a second device, a first video stream from the first device and a second video stream from the second device within a graphical user interface of the video conference, wherein both of the first video stream and the second video stream are displayed using an initial aspect ratio; determine, based on the first video stream, a change in a number of people participating in the video conference from the first device; determine, based on the change in the number of people participating in the video conference from the first device, an adjusted aspect ratio to use for displaying the first video stream within the graphical user interface of the video conference; and display the first video stream within the graphical user interface of the video conference using the adjusted aspect ratio while the second video stream remains displayed within the graphical user interface of the video conference using the initial aspect ratio.

In some implementations of the method, non-transitory computer readable medium, or apparatus, the change in the number of people participating in the video conference from the first device corresponds to an increase in the number of people depicted within the first video stream, and determining the adjusted aspect ratio to use for displaying the first video stream within the graphical user interface of the video conference comprises increasing an aspect ratio used for displaying the first video stream within the graphical user interface of the video conference from the initial aspect ratio to the adjusted aspect ratio, wherein use of the adjusted aspect ratio causes a depiction of a larger portion of a field of view of a camera of the first device within the first video stream.

In some implementations of the method, non-transitory computer readable medium, or apparatus, the change in the number of people participating in the video conference from the first device corresponds to a decrease in the number of people depicted within the first video stream, and determining the adjusted aspect ratio to use for displaying the first video stream within the graphical user interface of the video conference comprises decreasing an aspect ratio used for displaying the first video stream within the graphical user interface of the video conference from the initial aspect ratio to the adjusted aspect ratio, wherein use of the adjusted aspect ratio causes a depiction of a smaller portion of a field of view of a camera of the first device within the first video stream.

In some implementations of the method, non-transitory computer readable medium, or apparatus, to display the first video stream and the second video stream using the initial aspect ratio, images of the first video stream and of the second video stream are cropped according to the initial aspect ratio.

In some implementations of the method, non-transitory computer readable medium, or apparatus, determining the change in the number of people participating in the video conference from the first device comprises processing a real-time transcription of the video conference to determine, based on a context of speech represented within the real-time transcription, an intention to include a new person at a location of the first device in the video conference.

In some implementations of the method, non-transitory computer readable medium, or apparatus, the method comprises, the operations comprise, and the processor is configured to execute the instructions for determining the initial aspect ratio prior to a start of the video conference based on one or both of sampled images obtained from the first device and the second device or display capabilities associated with the first device and the second device.

In some implementations of the method, non-transitory computer readable medium, or apparatus, the method comprises, the operations comprise, and the processor is configured to execute the instructions for, based on the change in the number of people participating in the video conference from the first device corresponding to a new person being detected within first video stream, generating composite images by combining a foreground including portions depicting the new person and an initial participant using the first device within images captured by a camera of the first device and a virtual background used at the first device for the video conference; and transmitting the composite images within the first video stream for display within the graphical user interface of the video conference using the adjusted aspect ratio.

In some implementations of the method, non-transitory computer readable medium, or apparatus, use of the initial aspect ratio causes a display of the first video stream using a portrait orientation and use of the adjusted aspect ratio causes a display of the first video stream using a landscape orientation.

In some implementations of the method, non-transitory computer readable medium, or apparatus, the initial aspect ratio is determined by a client application running at the first device and used to connect the first device to the video conference.

In some implementations of the method, non-transitory computer readable medium, or apparatus, the method comprises, the operations comprise, and the processor is configured to execute the instructions for detecting screen share content from one of the first device or the second device; and displaying the screen share content within the graphical user interface of the video conference using the initial aspect ratio.

In some implementations of the method, non-transitory computer readable medium, or apparatus, the method comprises, the operations comprise, and the processor is configured to execute the instructions for determining the initial aspect ratio prior to a start of the video conference based on one or more sampled images obtained from the first device and the second device and based on display capabilities associated with the first device and the second device.

In some implementations of the method, non-transitory computer readable medium, or apparatus, while the first video stream and the second video stream are displayed using the initial aspect ratio, images of one or both of the first video stream or the second video stream are cropped according to the initial aspect ratio.

In some implementations of the method, non-transitory computer readable medium, or apparatus, the first video stream is displayed at a first orientation when the initial aspect ratio is used and at a second orientation when the adjusted aspect ratio is used.

In some implementations of the method, non-transitory computer readable medium, or apparatus, the first video stream is displayed at a first size within the graphical user interface of the video conference when the initial aspect ratio is used and at a second size within the graphical user interface of the video conference when the adjusted aspect ratio is used, the first size is smaller than the second size where the change in the number of people participating in the video conference from the first device corresponds to an increase in the number of people depicted within the first video stream, and the first size is larger than the second size where the change in the number of people participating in the video conference from the first device corresponds to a decrease in the number of people depicted within the first video stream.

In some implementations of the method, non-transitory computer readable medium, or apparatus, determining the change in the number of people participating in the video conference from the first device comprises determining, based on natural language processing performed against speech audio of the video conference, an intention to include a new person at a location of the first device in the video conference.

In some implementations of the method, non-transitory computer readable medium, or apparatus, the method comprises, the operations comprise, and the processor is configured to execute the instructions for determining, based on the first video stream, that the number of people participating in the video conference from the first device has returned to an initial value; and determining, based on the number of people participating in the video conference from the first device having returned to the initial value, to use the initial aspect ratio to display the first video stream within the graphical user interface of the video conference.

In some implementations of the method, non-transitory computer readable medium, or apparatus, the method comprises, the operations comprise, and the processor is configured to execute the instructions for, based on the change in the number of people participating in the video conference from the first device corresponding to a new person being detected within first video stream, remove a virtual background used at the first device for the video conference.

In some implementations of the method, non-transitory computer readable medium, or apparatus, the adjusted aspect ratio is determined by server-side software implementing the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   displaying, during a video conference between a first device and a second device, a first video stream from the first device and a second video stream from the second device within a graphical user interface of the video conference, wherein both of the first video stream and the second video stream are displayed using an initial aspect ratio;
   determining, based on the first video stream, a change in a number of people participating in the video conference from the first device;
   determining, based on the change in the number of people participating in the video conference from the first device, an adjusted aspect ratio to use for displaying the first video stream within the graphical user interface of the video conference;
   adjusting the display of the first video stream within the graphical user interface of the video conference to use the adjusted aspect ratio; and
   adjusting, based on the use of the adjusted aspect ratio with the first video stream, the display of the second video stream within the graphical user interface of the video conference to use the adjusted aspect ratio.

2. The method of claim 1, wherein the change in the number of people participating in the video conference from the first device corresponds to an increase in the number of people depicted within the first video stream, and wherein determining the adjusted aspect ratio to use for displaying the first video stream within the graphical user interface of the video conference comprises:
   increasing an aspect ratio used for displaying the first video stream within the graphical user interface of the video conference from the initial aspect ratio to the adjusted aspect ratio,
   wherein use of the adjusted aspect ratio causes a depiction of a larger portion of a field of view of a camera of the first device within the first video stream.

3. The method of claim 1, wherein the change in the number of people participating in the video conference from the first device corresponds to a decrease in the number of people depicted within the first video stream, and wherein determining the adjusted aspect ratio to use for displaying the first video stream within the graphical user interface of the video conference comprises:
   decreasing an aspect ratio used for displaying the first video stream within the graphical user interface of the video conference from the initial aspect ratio to the adjusted aspect ratio,
   wherein use of the adjusted aspect ratio causes a depiction of a smaller portion of a field of view of a camera of the first device within the first video stream.

4. The method of claim 1, wherein, to display the first video stream and the second video stream using the initial aspect ratio, images of the first video stream and of the second video stream are cropped according to the initial aspect ratio.

5. The method of claim 1, wherein determining the change in the number of people participating in the video conference from the first device comprises:
   processing a real-time transcription of the video conference to determine, based on a context of speech represented within the real-time transcription, an intention to include a new person at a location of the first device in the video conference.

6. The method of claim 1, comprising:
   determining the initial aspect ratio prior to a start of the video conference based on one or both of sampled images obtained from the first device and the second device or display capabilities associated with the first device and the second device.

7. The method of claim 1, comprising:
based on the change in the number of people participating in the video conference from the first device corresponding to a new person being detected within first video stream, generating composite images by combining a foreground including portions depicting the new person and an initial participant using the first device within images captured by a camera of the first device and a virtual background used at the first device for the video conference; and
transmitting the composite images within the first video stream for display within the graphical user interface of the video conference using the adjusted aspect ratio.

8. The method of claim 1, wherein use of the initial aspect ratio causes a display of the first video stream using a portrait orientation and use of the adjusted aspect ratio causes a display of the first video stream using a landscape orientation.

9. The method of claim 1, wherein the initial aspect ratio is determined by a client application running at the first device and used to connect the first device to the video conference.

10. A non-transitory computer readable medium storing instructions operable to cause one or more processors to perform operations comprising:
displaying, during a video conference between a first device and a second device, a first video stream from the first device and a second video stream from the second device within a graphical user interface of the video conference, wherein both of the first video stream and the second video stream are displayed using an initial aspect ratio;
determining, based on the first video stream, a change in a number of people participating in the video conference from the first device;
determining, based on the change in the number of people participating in the video conference from the first device, an adjusted aspect ratio to use for displaying the first video stream within the graphical user interface of the video conference;
adjusting the display of the first video stream within the graphical user interface of the video conference to use the adjusted aspect ratio; and
adjusting, based on the use of the adjusted aspect ratio with the first video stream, the display of the second video stream within the graphical user interface of the video conference to use the adjusted aspect ratio.

11. The non-transitory computer readable medium of claim 10, the operations comprising:
detecting screen share content from one of the first device or the second device; and
displaying the screen share content within the graphical user interface of the video conference using the initial aspect ratio.

12. The non-transitory computer readable medium of claim 10, the operations comprising:
determining the initial aspect ratio prior to a start of the video conference based on one or more sampled images obtained from the first device and the second device and based on display capabilities associated with the first device and the second device.

13. The non-transitory computer readable medium of claim 10, wherein, while the first video stream and the second video stream are displayed using the initial aspect ratio, images of one or both of the first video stream or the second video stream are cropped according to the initial aspect ratio.

14. The non-transitory computer readable medium of claim 10, wherein the first video stream is displayed at a first orientation when the initial aspect ratio is used and at a second orientation when the adjusted aspect ratio is used.

15. An apparatus, comprising:
a memory; and
a processor configured to execute instructions stored in the memory to:
display, during a video conference between a first device and a second device, a first video stream from the first device and a second video stream from the second device within a graphical user interface of the video conference, wherein both of the first video stream and the second video stream are displayed using an initial aspect ratio;
determine, based on the first video stream, a change in a number of people participating in the video conference from the first device;
determine, based on the change in the number of people participating in the video conference from the first device, an adjusted aspect ratio to use for displaying the first video stream within the graphical user interface of the video conference; and
adjust the display of the first video stream within the graphical user interface of the video conference to use the adjusted aspect ratio; and
adjust, based on the use of the adjusted aspect ratio with the first video stream, the display of the second video stream within the graphical user interface of the video conference to use the adjusted aspect ratio.

16. The apparatus of claim 15, wherein the first video stream is displayed at a first size within the graphical user interface of the video conference when the initial aspect ratio is used and at a second size within the graphical user interface of the video conference when the adjusted aspect ratio is used,
wherein the first size is smaller than the second size where the change in the number of people participating in the video conference from the first device corresponds to an increase in the number of people depicted within the first video stream, and
wherein the first size is larger than the second size where the change in the number of people participating in the video conference from the first device corresponds to a decrease in the number of people depicted within the first video stream.

17. The apparatus of claim 15, wherein, to determine the change in the number of people participating in the video conference from the first device, the processor is configured to execute the instructions to:
determine, based on natural language processing performed against speech audio of the video conference, an intention to include a new person at a location of the first device in the video conference.

18. The apparatus of claim 15, wherein the processor is configured to execute the instructions to:
determine, based on the first video stream, that the number of people participating in the video conference from the first device has returned to an initial value; and
determine, based on the number of people participating in the video conference from the first device having returned to the initial value, to use the initial aspect ratio to display the first video stream within the graphical user interface of the video conference.

19. The apparatus of claim 15, wherein the processor is configured to execute the instructions to:
   based on the change in the number of people participating in the video conference from the first device corresponding to a new person being detected within the first video stream, remove a virtual background used at the first device for the video conference.

20. The apparatus of claim 15, wherein the adjusted aspect ratio is determined by server-side software implementing the video conference.

* * * * *